(12) United States Patent
Jackson et al.

(10) Patent No.: US 7,975,925 B2
(45) Date of Patent: Jul. 12, 2011

(54) CARTRIDGE READER THAT ACCEPTS DATA CARTRIDGES BOTH IN AND OUT OF DATA CARTRIDGE CASES

(75) Inventors: Robert S. Jackson, Little Canada, MN (US); Jody L. Gregg, Lake Elmo, MN (US); G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 296 days.

(21) Appl. No.: 12/322,599

(22) Filed: Feb. 4, 2009

(65) Prior Publication Data

US 2010/0193589 A1    Aug. 5, 2010

(51) Int. Cl.
*G06K 7/10* (2006.01)
(52) U.S. Cl. .............. 235/462.01; 235/440; 235/486; 235/383; 360/132
(58) Field of Classification Search ............ 235/462.01, 235/440, 373, 486; 360/132
See application file for complete search history.

(56) References Cited

U.S. PATENT DOCUMENTS

| 3,873,871 | A * | 3/1975 | Hofmann | 313/157 |
| 2002/0150035 | A1* | 10/2002 | Bernacki et al. | 369/300 |
| 2005/0263589 | A1* | 12/2005 | Kikuchi | 235/383 |
| 2007/0253109 | A1* | 11/2007 | Soeken | 360/132 |

FOREIGN PATENT DOCUMENTS

DE    202008004956 (U1)    8/2008

OTHER PUBLICATIONS

Fujifilm 13.56 MHz LTO Cartridge Memory (LTO-CM) Data Sheet, 1 page "Proposed Addition of Read and Write Attribute Commands to SPC-2," Document T10/99-148r7, date May 4, 2000, pp. 1-23.
"hp ultrium drives technical reference manual generations 1 and 2 SCSI and FC drives," vol. 6: background to Ultrium drives, Hewlett-Packard, Part No. C7379-90900, Edition 2, Feb. 2003, pp. 1-68.
ECMA Standardizing Information and Communication Systems, "Data Interchange on 12,7 mm 384-Track Magnetic Tape Cartridges-Ultrium-1 Format," Standard ECMA-319, Jun. 2001, pp. 1-141.

* cited by examiner

*Primary Examiner* — Allyson N Trail
(74) *Attorney, Agent, or Firm* — Shumaker & Sieffert, P.A.

(57) ABSTRACT

A cartridge reader device includes an RFID unit that reads cartridge memory (CM) data from an RFID tag of a data cartridge, a bar code unit that reads a bar code of the data cartridge, and a housing that encloses the RFID unit and the bar code unit. The housing defines a first receiving area configured to accept the data cartridge when the data cartridge is enclosed in a case, which enables the bar code unit to read the bar code data from the bar code of the data cartridge when the data cartridge is enclosed in the case, and a second receiving area configured to accept the data cartridge when the data cartridge is not enclosed in the case, which enables the bar code unit to read the bar code data from the bar code of the data cartridge when the data cartridge is not enclosed in the case.

20 Claims, 7 Drawing Sheets

CARTRIDGE READER THAT ACCEPTS DATA CARTRIDGES BOTH IN AND OUT OF DATA CARTRIDGE CASES

TECHNICAL FIELD

This disclosure relates to readers of data cartridges and, more particularly, cartridge readers that have bar code and radio frequency identification (RFID) capabilities.

BACKGROUND

Increases in the amount of data handled by computer systems have led to demands for data storage backup devices that use magnetic tape. Magnetic tape media remains an economical medium for storing large amounts of data. For example, magnetic tape cartridges, or large spools of magnetic tape, are often used to back up large amounts of data for large computing centers. Magnetic tape cartridges also find application in the backup of data stored on smaller computers such as workstations, desktop, or laptop computers. In addition, magnetic tape media can be used for other types of data storage, e.g., unrelated to data backup.

Automated cartridge libraries provide access to vast amounts of electronic data by managing magnetic data tape cartridges. Automated cartridge libraries exist in all sizes, ranging from small library systems that provide access to twenty or fewer data cartridges, to larger library systems that provide access to thousands of data cartridges.

One type of data storage system includes a linear tape drive. Linear tape-open (LTO) data cartridges are representative of linear tape products. Conventional LTO cartridges include a cartridge memory (CM) chip that may be, for example, a radio-frequency identification (RFID) chip. The CM chip may be affixed to or within a housing of the tape cartridges. LTO drives typically include an RFID interface that enables the drive to read and/or write data to the CM chip of an LTO cartridge. LTO drives include a radio frequency interface to read and write data to the CM chip over radio frequency signals. Other types of linear tape cartridges with similar radio frequency chips include IBM 3592 data cartridges and Sun T10000 data cartridges. Future tape cartridges will likely use CM chips as well.

SUMMARY

In general, this disclosure relates to a stand-alone cartridge reader that includes both a radio frequency identification (RFID) reader and a bar code reader. A data cartridge may include an RFID cartridge memory (CM) chip, a bar code, or both. The cartridge reader is designed to read both a CM chip and a bar code of a data cartridge. The cartridge reader is a stand-alone device in that the reader does not generally read data from a magnetic tape of the data cartridge. The cartridge reader is designed to receive data cartridges either in or out of a case, such as a polypropylene case, that is designed to protect the data cartridges. The design of the cartridge reader properly positions data cartridges whether the cartridges are stored in a case or not. That is, the design of the cartridge reader causes a data cartridge to be properly positioned such that the reader can retrieve both data from a CM chip and a bar code of the data cartridge, whether or not the cartridge is in a case at the time of the scan.

Data cartridges are often placed in cases to protect the cartridge during handling, transportation, and storage of the cartridge. With conventional cartridge readers, a user may be required to remove the cartridge from the case before the cartridge reader could retrieve data from an RFID tag or bar code of the cartridge. In accordance with the techniques described herein, however, a user may either leave the cartridge in the case or remove the cartridge from the case, and in either situation, the cartridge reader will be able to retrieve CM chip data from the RFID tag and bar code data from the bar code of the cartridge.

In one embodiment, a cartridge reader device includes an RFID unit that reads CM data from an RFID tag of a data cartridge, a bar code unit that reads bar code data from a bar code of the data cartridge, and a housing that encloses the RFID unit and the bar code unit, wherein the housing defines a first receiving area and a second receiving area, wherein the first receiving area is configured to accept the data cartridge when the data cartridge is enclosed in a case and enables the bar code unit to read the bar code data from the bar code of the data cartridge when the data cartridge is enclosed in the case, and wherein the second receiving area is configured to accept the data cartridge when the data cartridge is not enclosed in the case and enables the bar code unit to read the bar code data from the bar code of the data cartridge when the data cartridge is not enclosed in the case.

In another embodiment, a system includes a data cartridge comprising a bar code and an RFID tag storing CM data, a cartridge reader comprising an RFID unit that reads the CM data from the RFID tag of the data cartridge, a bar code unit that reads bar code data from the bar code of the data cartridge, and housing that encloses the RFID unit and the bar code unit, wherein the housing defines a first receiving area and a second receiving area, wherein the first receiving area is configured to accept the data cartridge when the data cartridge is enclosed in a case and enables the bar code unit to read the bar code data from the bar code of the data cartridge when the data cartridge is enclosed in the case, and wherein the second receiving area is configured to accept the data cartridge when the data cartridge is not enclosed in the case and enables the bar code unit to read the bar code data from the bar code of the data cartridge when the data cartridge is not enclosed in the case, and a computing device coupled to the cartridge reader, wherein the computing device causes the cartridge reader to retrieve the bar code data and the CM data from the data cartridge, and wherein the computing device receives the bar code data and the CM data from the cartridge reader.

In another embodiment, a device includes means for reading CM data from an RFID tag of a data cartridge, means for reading bar code data from a bar code of the data cartridge, and housing means for enclosing the means for reading CM data and the means for reading bar code data, wherein the housing means comprises means for accepting the data cartridge when the data cartridge is enclosed in a case that enables the means for reading the bar code data to read the bar code data from the bar code of the data cartridge when the data cartridge is enclosed in the case, and wherein the housing means comprises means for accepting the data cartridge when the data cartridge is not enclosed in the case that enables the means for reading the bar code data to read the bar code data from the bar code of the data cartridge when the data cartridge is not enclosed in the case.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
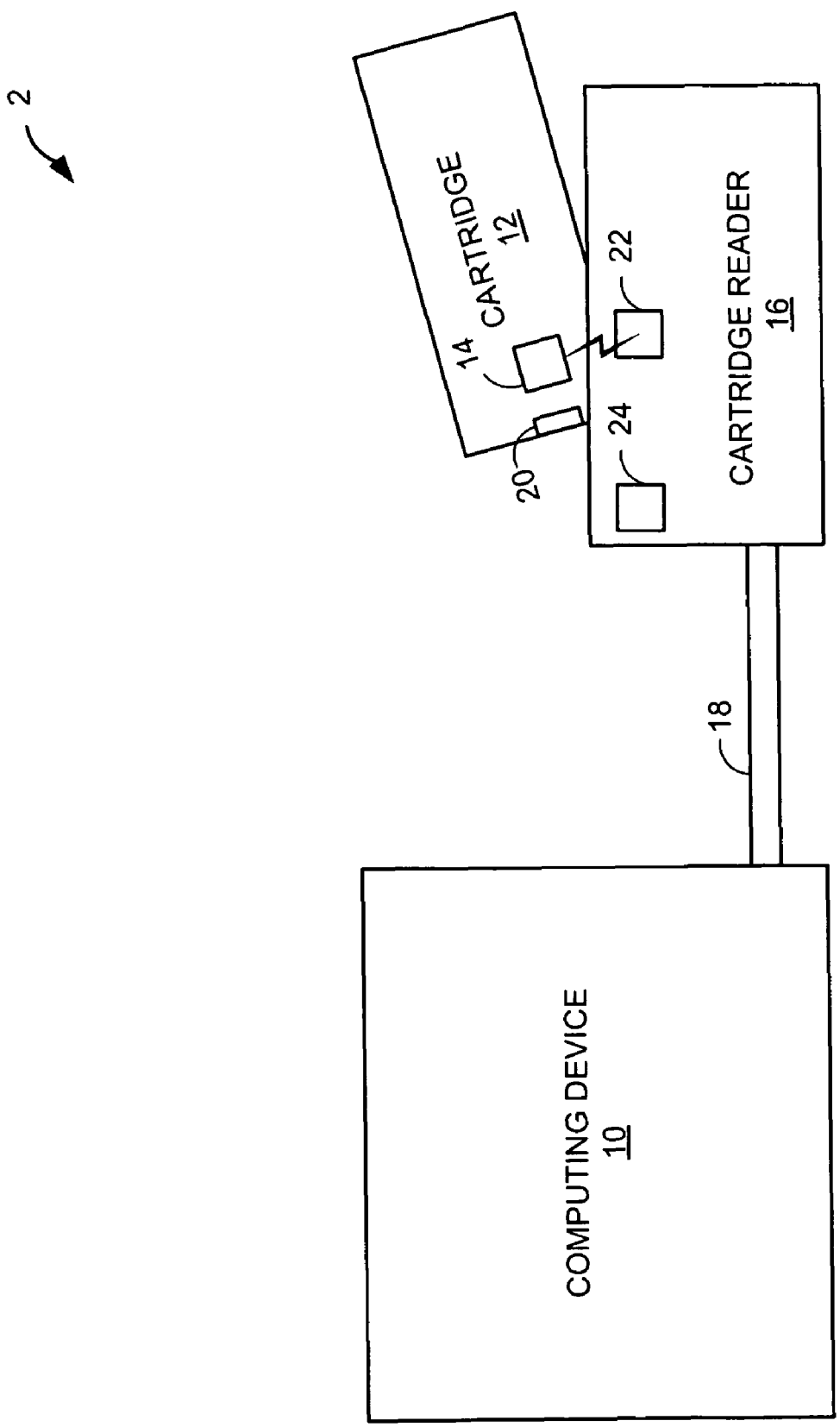
FIG. 1 is a block diagram illustrating an example system for retrieving data from a data cartridge.

FIG. 1 is a block diagram illustrating an example system 2 for retrieving data from cartridge 12. The techniques and embodiments discussed herein are applicable to cartridge readers for data cartridges such as, for example, Linear Tape-Open data cartridges, IBM 3592 data cartridges, and Sun T10000 data cartridges. Generally, the techniques and embodiments of this disclosure may apply to any data cartridge readers that receive data cartridges that include a cartridge memory (CM) chip and/or a bar code 20.

In the example of FIG. 1, LTO cartridge 12 includes CM chip 14 and bar code 20. In one embodiment, CM chip 14 comprises a radio frequency identification (RFID) tag that is adhered to or within a housing of cartridge 12. Cartridge reader 16 may be capable of reading data from and writing data to CM chip 14 and reading data from bar code 20. In particular, cartridge reader 16 may be capable of reading and writing data of CM chip 14 at a distance of, for example, 10 mm. Cartridge reader 16 may be a stand-alone device that reads data from CM chip 14 and bar code 20 of a data cartridge and that does not read data from a magnetic tape of the data cartridge. In some embodiments, certain components of cartridge reader 16 may be incorporated into, for example, a cartridge drive that also reads data from a magnetic tape of cartridge 12. However, in general, cartridge reader 16 reads CM data from CM chip 14 and bar code data from bar code 20.

Cartridge reader 16 includes both CM tag reader 22 and bar code reader 24. CM tag reader 22 may comprise an RFID engine for reading passive RFID tags, while bar code reader 24 may comprise a bar code scanning engine. CM tag reader 22 interrogates CM chip 14 using electromagnetic energy to energize CM chip 14 and detects electromagnetic energy emitted or modulated from CM chip 14. The modulated electromagnetic energy is encoded with information stored within CM chip 14, which the RFID engine may decode and interpret, and pass the interpreted information to cartridge reader 16 and/or computing device 10.

Bar code reader 24 transmits light to illuminate bar code 20 and detects a reflection of the light from bar code 20 to identify a pattern of bar code 20. The pattern of bar code 20 encodes information of bar code 20, therefore bar code reader 24 is able to decode and retrieve the information from bar code 20 by the reflection of the light. Bar code reader 24 may include a photo conductor that translates optical signals into electrical signals to translate the light reflected from bar code 20 into electrical signals that are further processed and interpreted to retrieve data from bar code 20. Bar code reader 24 may transmit the beam of light from one or more light-emitting diodes (LEDs), a laser, or other light transmitting means.

Cartridge reader 16 reads CM chip data from CM chip 14 via CM tag reader 22. Cartridge reader 16 also retrieves data from bar code 20 of cartridge 12 via bar code reader 24. Cartridge reader 16 may retrieve either or both of bar code data and CM chip data from cartridge 12. Although the example cartridge 12 of FIG. 1 includes both a bar code and a CM chip, other data cartridges may only have one of either a bar code or a CM chip.

In one embodiment, CM chip 14 may be a chip conforming to the LTO-CM standard. LTO-CM chips are used to identify the cartridge and information about the cartridge. LTO-CM chips include a re-writeable section that includes initialization data when a format is initialized or reinitialized, usage information, a tape directory, end-of-data (EOD) information, mechanism manufacturer information, and application specific data. LTO-CM chips may be divided into 128 blocks of 32 bytes each, for a total storage capacity of 4096 bytes, in accordance with certain versions of the LTO-CM standard. Other examples may contain a larger storage capacity.

In the example of FIG. 1, system 2 includes computing device 10 coupled to cartridge reader 16 via link 18. In one embodiment, link 18, between computing device 10 and cartridge reader 16, may include an RS232 interface, USB interface, or another interface. Cartridge reader 16 may also include an interface (not shown in FIG. 1) that may connect to link 18. In one example embodiment, cartridge reader 16 may include one or more modules, either in hardware or in software, to perform the functions described with respect to computing device 10.

Computing device 10 controls cartridge reader 16 to read or write CM chip data to CM chip 14 via CM tag reader 22. CM chip data may include, for example, information regarding mounts of cartridge 12 to a cartridge drive, number of reads of the magnetic tape of cartridge 12, number of writes to the magnetic tape of cartridge 12, manufacturer data regarding cartridge 12, or other data. Computing device 10 also causes cartridge reader 16 to retrieve information from bar code 20 of cartridge 12 via bar code reader 24. The bar code data of bar code 20 may include any of a wide variety of information such as, for example, a cartridge identifier, a manufacturer identifier, a time of manufacture, a volume and/or serial number of the cartridge, anomalies during reads and/or writes to the data cartridge, or other data. Bar code 20 may be permanently affixed or may be temporarily affixed and possibly replaced periodically. In one embodiment, bar code 20 may comprise a VOLSER label. Computing device 10 may comprise a stand-alone general purpose computer or workstation that executes software that facilitates interaction of computing device 10 with cartridge reader 16. Computing device 10 may also comprise a specialized computer designed solely to interact with cartridge reader 16. In general, computing device 10 causes cartridge reader 16 to read data from and/or write data to CM chip 14 and to retrieve data from bar code 20.

In accordance with the techniques described herein, cartridge reader 16 is configured to receive cartridge 12 whether or not cartridge 12 is in a case, such as a standard, polypropylene case designed to enclose and protect the data cartridge. A housing of cartridge reader 16 defines a first receiving area to receive a cartridge that is in a case and a second receiving area to receive a cartridge that is not in a case. The housing of cartridge reader 16 is configured such that bar code reader 24 is able to read bar code 20 of cartridge 12 regardless of whether cartridge 12 is in a case. The housing of cartridge reader 16 may be shaped to position bar code 20 of cartridge 12 in the proper location regardless of whether cartridge 12 is in a case by placing the cartridge in either the first receiving area or the second receiving area. For example, the housing may have two nests, a first nest to receive a cartridge in a case and a second nest to receive a cartridge without a case. As another example, the housing may have an insert that is locatable within or upon the housing to properly position a cartridge outside of a case, and the insert may be removed to properly position a cartridge that is in a case on the housing of cartridge reader 16. As another example, the housing may have rotational members that rotate to a first position to properly position a data cartridge that is in a case and to a second position to properly position a data cartridge that is not in a case.

In any case, the housing of cartridge reader 16 is configured to include a first receiving area to receive a data cartridge that is in a case and a second receiving area to receive a data cartridge that is not in a case. The first receiving area causes data cartridge 12 to be properly positioned such that bar code reader 24 of cartridge reader 16 is able to read bar code data from bar code 20 when data cartridge 12 is in a case. The first receiving area also causes the data cartridge to be properly positioned such that CM tag reader 22 is able to read CM chip data from CM chip 14 when data cartridge 12 is in a case. Likewise, the second receiving area causes data cartridge 12 to be properly positioned when data cartridge 12 is not in a case, such that bar code reader 24 is able to read bar code data from bar code 20 and CM tag reader 22 is able to read CM chip data from CM chip 14.

Cartridge reader 16 may include other features as well, e.g., to simplify the use and portability of cartridge reader 16. A set of mirrors within cartridge reader 16 may reflect light from bar code reader 24 in a u-shaped path to reduce the horizontal size of cartridge reader 16, effectively reducing the size of the cartridge reader while maintaining the distance from the bar code reader to the bar code of the data cartridge. A housing of cartridge reader 16 may be designed to accommodate an average user's hand size to increase the ease of carrying cartridge reader 16. The housing may also include lead-in angles to simplify insertion of data cartridge 12 into cartridge reader 16. An insertion angle for insertion of data cartridge 12 into cartridge reader 16 may be optimized to prevent damage to data cartridge 12 and cartridge reader 16, while allowing data cartridge 12 to slide into position due to the force of gravity, e.g., the housing may feature an insertion angle between 11 degrees and 17 degrees. The housing may form a gap between the bottom of data cartridge 12 and the bottom of cartridge reader 16 when data cartridge 12 is inserted into cartridge reader 16, such that a user's fingers can easily slide under data cartridge 12 to grip and remove data cartridge 12 from cartridge reader 16.

Figure 2A:
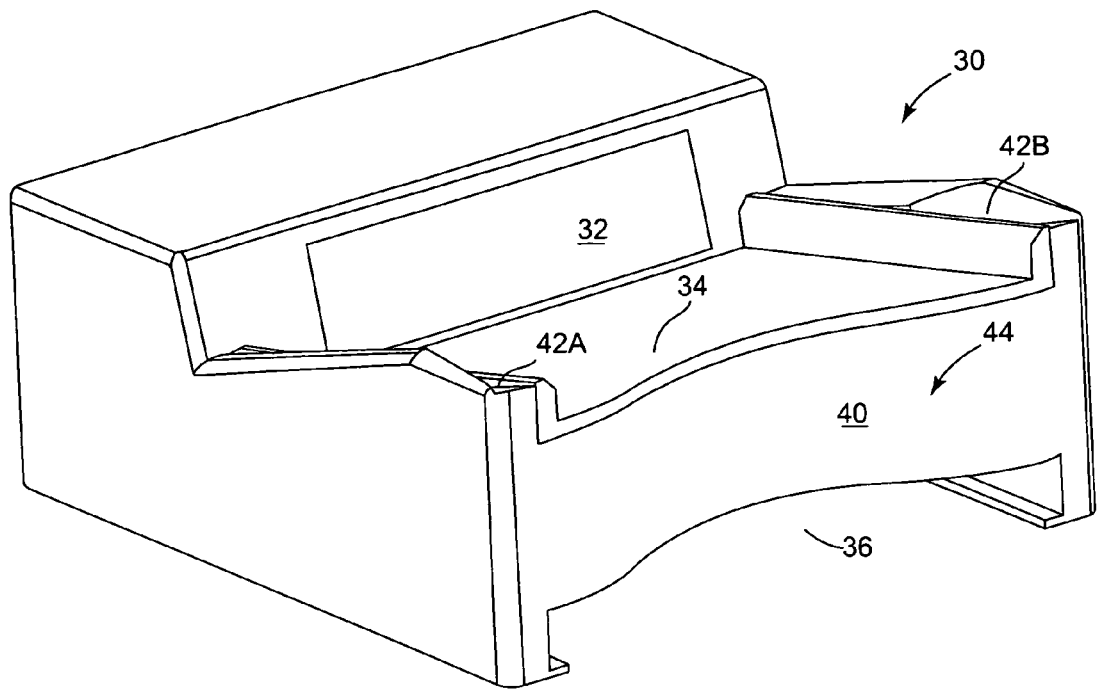
FIGS. 2A-2B are perspective front views of an example embodiment of a cartridge reader that includes a removable insert.
Figure 2B:
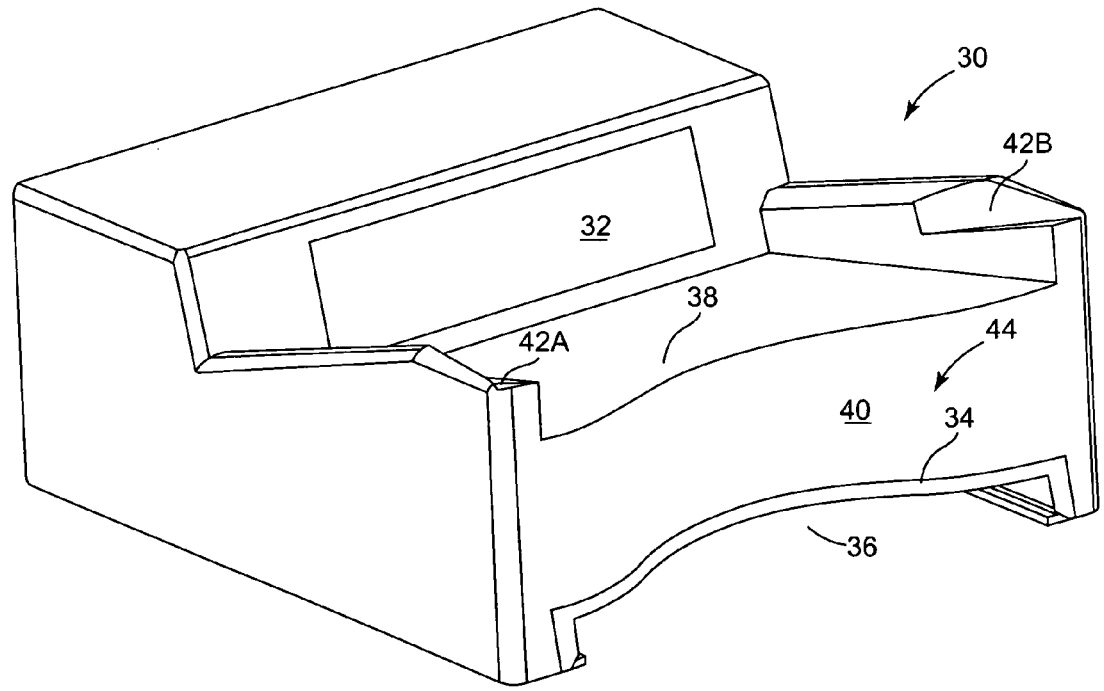

FIGS. 2A-2B are perspective front views of an example cartridge reader 30 that includes removable insert 34. Removable insert 34 may be inserted or removed from cartridge reader 30 based on whether a data cartridge, such as cartridge 12 (FIG. 1), is within or without a case. Removable insert 34 can be slid into a top portion (e.g., on top of surface 38 of FIG. 2B) of housing 40 of cartridge reader 30. In other embodiments, removable insert 34 may be screwed into place, snapped into place, slid and captured into place, rotated into place, or otherwise placed into the top portion of housing 40 or other portion of housing 40 intended for receiving data cartridges. Housing 40 of cartridge reader 30 defines a first receiving area with removable insert 34 in place and a second receiving area with removable insert 34 removed. FIG. 2A depicts removable insert 34 inserted into position to accept a data cartridge that is not in a case. FIG. 2B depicts cartridge reader 30 without removable insert 34 in place to accept a data cartridge that is in a case.

In the example of FIGS. 2A-2B, cartridge reader 30 further includes storage area 36 that accepts removable insert 34 when removable insert 34 is not required. A user of cartridge reader 30 may remove removable insert 34 and place removable insert 34 in storage area 36 of cartridge reader 30, e.g., when the user expects to scan data from a data cartridge that is in a case, as shown in FIG. 2B.

Cartridge reader 30 includes an RFID reader and a bar code reader (not shown in FIGS. 2A-2B). Window 32 of cartridge reader 30 permits emitted light from the bar code reader to pass through window 32 to contact a bar code of a data cartridge. Removable insert 34 is configured such that, when a data cartridge is not in a case and when removable insert 34 is positioned on housing 40 of cartridge reader 30, the emitted light from the bar code reader properly contacts the bar code of the data cartridge. Removable insert 34 may have a thickness that is generally as thick as a case used to protect a data cartridge, such as cartridge 12. The thickness of removable insert 34 may be, for example, 0.115 inches (0.292 cm). Polypropylene cases that are used to contain data cartridges are generally also 0.115 inches (0.292 cm) thick, thus the data cartridge will be in the same position on cartridge reader 30 whether or not the data cartridge is in a case. Surface 38 of housing 40 is configured such that, when a data cartridge is in a case and when removable insert 34 is not positioned on housing 40, the emitted light from the bar code reader also properly contacts the bar code of the data cartridge.

Housing 40 of cartridge reader 30 includes other features as well, in the example embodiment of FIGS. 2A-2B. For example, housing 40 includes lead-in angles 42A and 42B that assist a user in properly positioning a data cartridge for cartridge reader 30. That is, when a user is inserting a data cartridge into cartridge reader 30, if the angle of insertion of the data cartridge is slightly off in the horizontal direction, lead-in angles 42A and 42B cause the cartridge to shift to the proper position. Lead-in angles 42A and 42B may be flat, as shown in FIGS. 2A-2B, or may be rounded in an alternative embodiment. Lead-in angles 42A and 42B need not necessarily be used in conjunction with embodiments utilizing a removable insert such as removable insert 34, and may generally be employed with any embodiment of a cartridge reader.

In one embodiment, surface 38 of housing 40 may include a molded illustration (not shown) that depicts how a data cartridge is to be inserted into cartridge reader 30. The illustration on surface 38 may include instructions for inserting a data cartridge that is in a case, such as an arrow and an image of a data cartridge. A similar molded illustration may be depicted on a surface of removable insert 34 that depicts a data cartridge being inserted into cartridge reader 30 that is not in a case. The molded illustrations (not shown in FIGS. 2A-2B) may include pictures, written descriptions, conceptual diagrams, warnings, icons, or other information.

Housing 40 also includes a half-moon cut-out 44 from the front of cartridge reader 30. This cut-out may cause a data cartridge to overhang the edge of housing 40 of cartridge reader 30, e.g., by approximately one inch (approximately 2.54 cm). This overhang may make retrieval of a data cartridge from cartridge reader 30 more simple than if the data cartridge were flush with the edge of housing 40 or if the data cartridge were to under-hang the edge of housing 40. Moreover, surface 38 of housing 40 may be separated from the bottom of cartridge reader 30 by over one inch (2.54 cm) in height to enable a user to retrieve a data cartridge from cartridge reader 30, i.e., such that fingers of the user may pass under the data cartridge when the data cartridge is inserted into cartridge reader 30 and when cartridge reader 30 rests on a surface, such as a table or desk. The half-moon cut-out of housing 40 need not necessarily be used in conjunction with embodiments utilizing a removable insert such as removable insert 34, and may generally be employed with any embodiment of a cartridge reader.

Figure 3A:
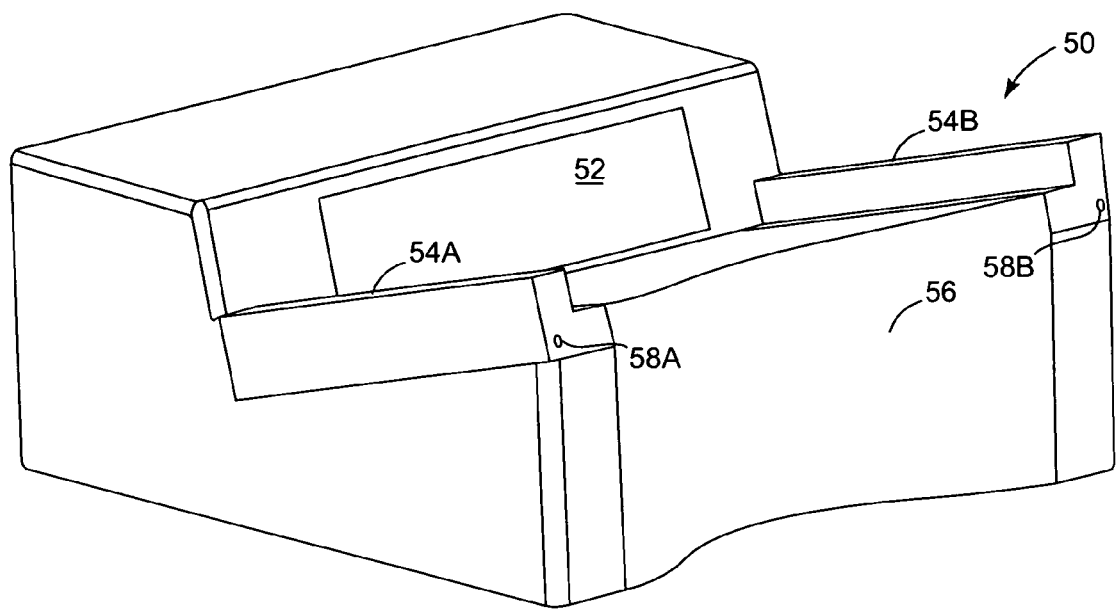
FIGS. 3A-3B are perspective front views of an example embodiment of a cartridge reader that includes rotatable members.
Figure 3B:
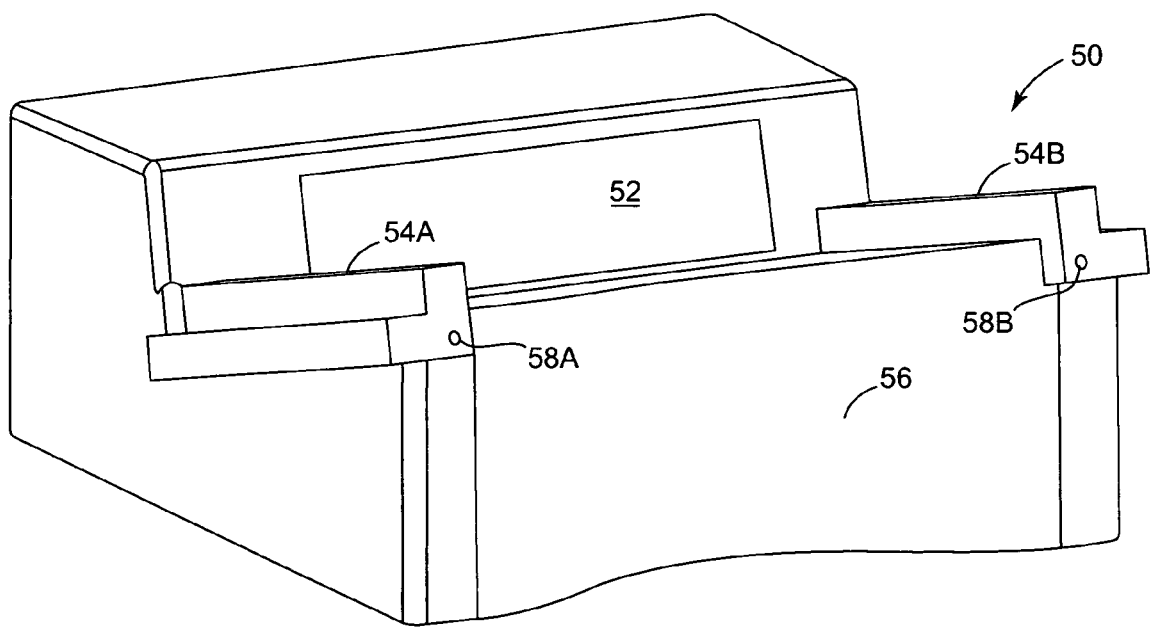

FIGS. 3A-3B are perspective front views of an example cartridge reader 50 that includes rotatable members 54A-54B (rotatable members 54). Rotatable members 54 rotate around pivot points 58A-58B (pivot points 58), respectively, to rotate between a first position and a second position. The first position of rotatable members 54, illustrated in FIG. 3A, enables cartridge reader 50 to retrieve data from a CM chip and a bar code from a data cartridge, such as cartridge 12 (FIG. 1) when the cartridge is not in a case. The second position of rotatable members 54, illustrated in FIG. 3B, enables cartridge reader 50 to retrieve data from a CM chip and a bar code from a data cartridge, such as cartridge 12, when the cartridge is in a case. Housing 56 defines a first receiving area when rotatable members 54 are rotated to the first position and a second receiving area when rotatable members 54 are rotated to the second position, where the first receiving area receives a data cartridge that is not in a case and the second receiving area receives a data cartridge that is in a case.

Cartridge reader 50 also includes window 52 to permit light to pass between the inside of housing 56 and the outside of housing 56. Cartridge reader 50 includes an RFID reader and a bar code reader within housing 56 (not shown). The bar code reader is able to read bar code data from a bar code of a data cartridge by transmitting light through window 52 to the bar code of the cartridge. Window 52 is the only portion of housing 56 that permits light to enter or exit housing 56. Therefore, the example of FIGS. 3A-3B may reduce the risk of exposure to users of cartridge reader 50 to the light from the bar code reader.

Housing 56 of cartridge reader 50 also defines a half-moon cut-out on the front of cartridge reader 50. As in the example of FIGS. 2A-2B, the half-moon cut-out may enable a user to more easily grip a data cartridge, whether or not the data cartridge is in a case, by enabling the data cartridge to overhang the edge of housing 56.

Figure 4:
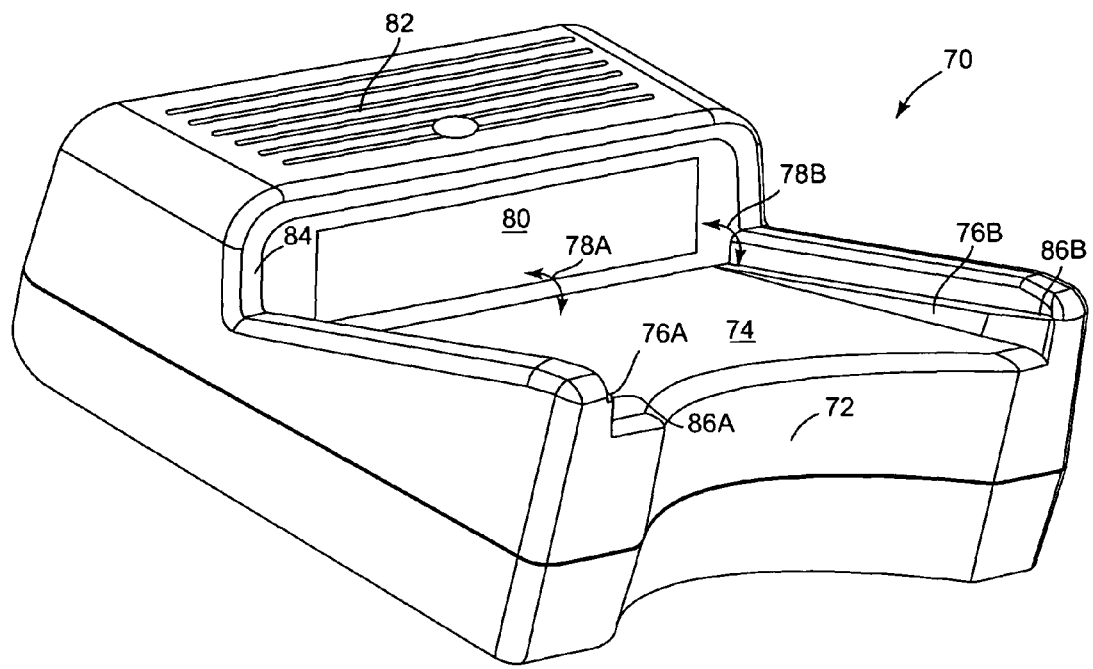
FIG. 4 is a perspective front view of an example embodiment of a cartridge reader that includes a pair of rails.

FIG. 4 is a perspective front view of an example cartridge reader 70 that includes a pair of rails 76A, 76B. Housing 72 of cartridge reader 70 defines a first receiving area with surface 74 and between rails 76A, 76B for receiving a data cartridge that is not in a case. Housing 72 of cartridge reader 70 also defines a second receiving area with the tops of rails 76A, 76B for receiving a data cartridge that is in a case. In general, housing 72 forms two nests superimposed over each other spatially using rails 76A, 76B and are displaced from each other at an angle.

Housing 72 includes ridges 82 to assist a user of cartridge reader 70 with gripping cartridge reader 70 when the user moves cartridge reader 70. As discussed in greater detail with respect to example housing 112 of FIG. 6, the height of the rear portion of housing 72 may be sized to enable a user to easily grip cartridge reader 70. For example, the height of the rear portion of housing 72 may be between approximately two and four inches (between approximately 5.08 cm and 10.16 cm). In other embodiments, such as that depicted in FIG. 7, housing 72 may define cut-outs on the sides of housing 72 to enable a user to more easily grip cartridge reader 70.

Housing 72 may define the first receiving area with a first angle of incidence 78A between rear surface 84 of housing 72 and top surface 74 and the second receiving area with a second angle of incidence 78B between rear surface 84 and the tops of rails 76A, 76B. Both of the first and second angles of incidence should be sized such that a bar code reader (not shown) within housing 72 can read bar code data from a bar code of a data cartridge, whether or not the data cartridge is in a case. For example, the first angle of incidence 78A may be approximately 90 degrees and the second angle of incidence 78B may be approximately 84 degrees. Window 80 of cartridge reader 70 permits emitted light from a bar code reader within cartridge reader 70 to pass through window 80 to contact a bar code of the data cartridge.

Top surface 74 may also be inclined relative to a horizontal base of housing 72, preferably between approximately 5 degrees and 45 degrees. In one embodiment, for example, the angle between top surface 74 and the horizontal base may be approximately 11 degrees. Likewise, the angle between the tops of rails 76A, 76B and the horizontal base may be slightly greater than the angle for top surface 74, e.g., approximately 17 degrees. Empirical data have shown that insertion angles between approximately 11 degrees and 17 degrees cause a cartridge to slide to become flush with rear surface 84 due to the force of gravity, but not so forcefully that the cartridge or the cartridge reader becomes damaged after sliding and impacting rear surface 84.

Housing 72 also defines two lead-in angles 86A, 86B at the respective ends of rails 76A, 76B. Lead-in angles 86A, 86B assist a user in properly positioning a data cartridge in either of the first receiving area or the second receiving area, as defined by housing 72.

Figure 5:
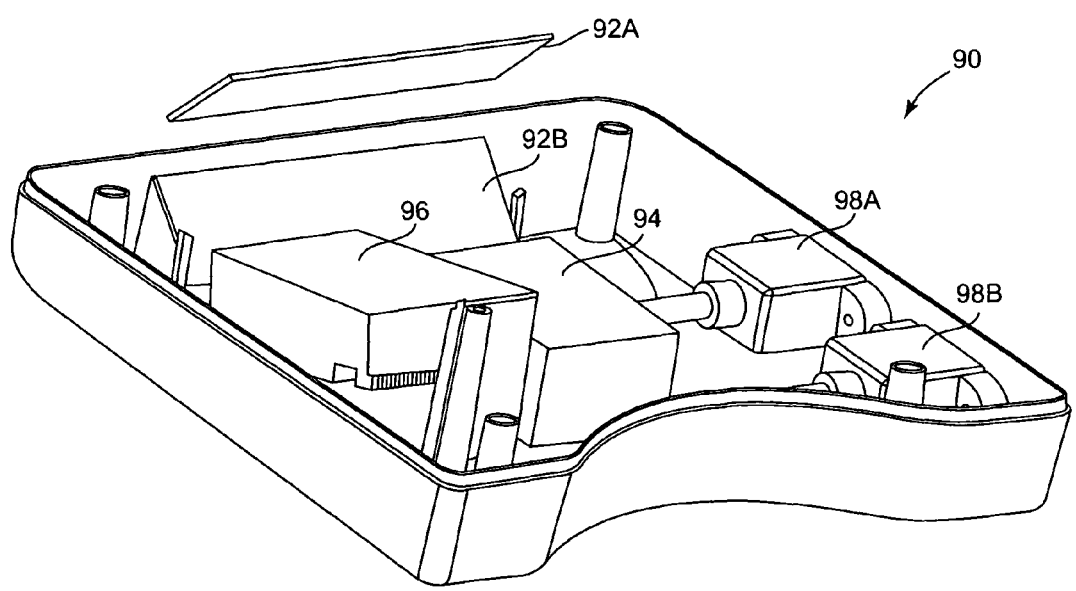
FIG. 5 is a partial exposed view illustrating internal components of an example embodiment of a cartridge reader.

FIG. 5 is a partial exposed view illustrating an example configuration of internal components of example cartridge reader 90. Cartridge reader 90 includes universal serial bus ports 98A, 98B (USB ports 98), RFID reader 96, bar code reader 94, and mirrors 92A, 92B (mirrors 92). Any or all of the internal components of cartridge reader may be included in any cartridge reader, such as any of cartridge readers 16, 30, 50, or 70. Thus cartridge reader 90 may, in various embodiments, correspond to any of cartridge readers 16, 30, 50, or 70, or other cartridge readers and other embodiments thereof.

Bar code reader 94 emits light to read a bar code, such as bar code 20 of cartridge 12. Bar code reader 94 may utilize a laser or one or more LEDs to emit light to read bar code 20 of cartridge 12. In general, the emitted light is reflected off of portions of bar code 20, and bar code reader 94 detects the reflected portions with a photo conductor that determines the presence and width of a black bar or a white bar of bar code 20 from a reflection of light from bar code 20. The photo conductor translates optical signals into electrical signals, which are analyzed and interpreted to obtain the data encoded by bar code 20.

To read a bar code, light emitted from a bar code reader must cover the entire width of the bar code. In general, a bar code must be placed a minimum distance from a bar code reader in order to ensure that light from the bar code reader is able to cover the width of the bar code. The minimum distance may be, for example, approximately three inches (7.62 cm). Mirrors 92 may be implemented to reduce the horizontal distance necessary within cartridge reader 90 to achieve the width distribution needed to read bar code 20. In particular, mirrors 92 can cause the light emitted from bar code reader 94 to travel in a u-shaped path. The total distance traversed by the light emitted from bar code reader 94 to bar code 20, when cartridge 12 is properly positioned, is long enough to allow the light to spread to the necessary width as a result of the positions of mirrors 92, but the light is directed in a u-shaped path to reduce the horizontal space necessary to allow the light to spread. The light emitted from bar code reader 94 spreads to accommodate the width of bar code 20 as the light travels between bar code reader 94, mirrors 92, and bar code 20. Accordingly, mirrors 92 may enable a reduction in the size of cartridge reader 90 that is necessary to accommodate a bar code reader. Cartridge reader 90 may therefore be compact in size and not require as much horizontal distance to accommodate the spread of the light as would be required without mirrors 92.

RFID reader 96 reads and/or writes data to and from an RFID tag of a data cartridge, such as CM chip 14 of cartridge 12 (FIG. 1). RFID reader 96 is placed within cartridge reader 90 at a distance from a top surface (not shown) of cartridge reader 90 to enable RFID reader 96 to read an RFID tag, such as CM chip 14, of cartridge 12. For example, RFID reader 96 may be mounted within cartridge reader 90 such that the distance between RFID reader 96 and CM chip 14 of cartridge 12 is less than 10 mm when cartridge 12 is properly positioned on cartridge reader 90. RFID reader 96 transmits electromagnetic energy to CM chip 14 and receives modulated electromagnetic energy from CM chip 14. The modulated electromagnetic energy encodes data from CM chip 14, which RFID reader 96 decodes for cartridge reader 90.

USB ports 98 act as interfaces between cartridge reader 90 and an external computing device, such as computing device 10 (FIG. 1). In other embodiments, other interfaces may be used in place of USB ports 98, such as ports designed to accommodate an RS232 serial link. In one embodiment, port 98A is a USB port, while port 98B is a serial port for an RS232 serial link. Ports 98 may also be other types of ports that create an interface between cartridge reader 90 and a computing device. Other embodiments may also include only a single port, or more than two ports. Some embodiments may further include a wireless interface to communicate with the computing device via a wireless network. In any case, USB ports 98, in the example of FIG. 5, enable an external computing device to control cartridge reader 90 and to retrieve data from cartridge reader 90, i.e., RFID reader 96 and bar code reader 94. Cartridge reader 90 may receive control signals through USB ports 98 and transmit data from RFID reader 96 and bar code reader 94 through USB ports 98.

Figure 6:
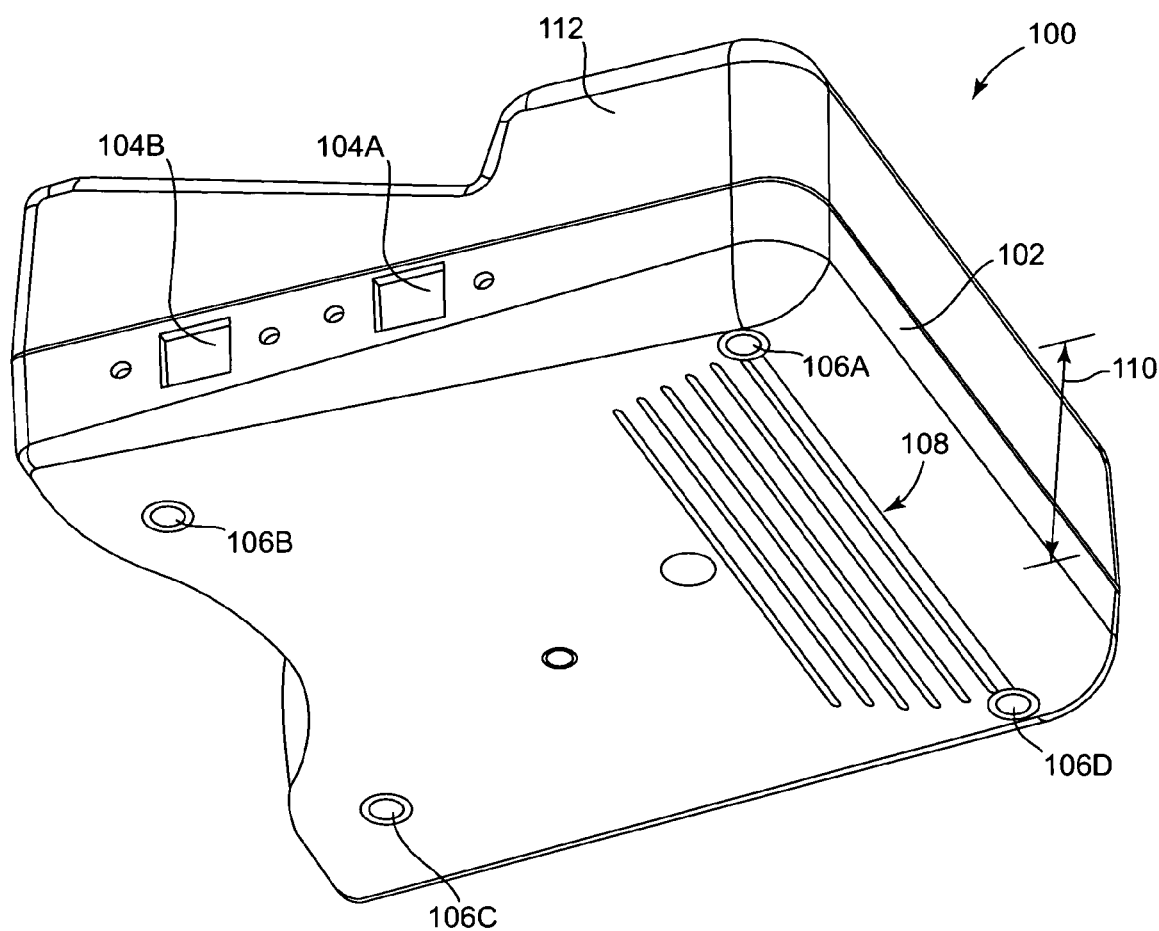
FIG. 6 is a perspective bottom view of lower housing of an example embodiment of a cartridge reader.

FIG. 6 is a perspective bottom view of a lower housing 102 of example cartridge reader 100. Cartridge reader 100 may correspond to any cartridge reader, such as cartridge readers 16, 30, 50, 70, and 90. That is, any of cartridge readers 16, 30, 50, 70, and 90 may include the features of cartridge reader 100 discussed with respect to FIG. 6. Lower housing 102 fits upper housing 112 to form a full housing for cartridge reader 100.

Height 110 of the full housing formed by upper housing 112 and lower housing 102 is sized to comfortably fit into an average-sized human hand. For example, height 110 may be between approximately two and four inches (between approximately 5.08 cm to 10.16 cm) when upper housing 112 and lower housing 102 are properly connected to form the full housing. Lower housing 102 also includes ridges 108 to make cartridge reader 100 easier for a user to hold. In this manner, the construction of the housing of cartridge reader 100 makes cartridge reader 100 conducive to hand-held, portable operation.

Lower housing 102 also includes holes 106A-106D (holes 106) that, in some embodiments, include rubber feet. In addition, screws or other fixation elements may be inserted through holes 106 to hold lower housing 102 to upper housing 112. Rubber feet may then be inserted into holes 106 to prevent cartridge reader 100 from sliding across a smooth surface, such as a table or desk, when data cartridges are positioned into cartridge reader 100 for scanning. In some embodiments, no screws are inserted, and holes 106 may comprise recesses in lower housing 102, rather than through-holes. Holes 106 may generally serve to locate and constrain the rubber feet. In some embodiments, extra weight may be inserted within the housing of cartridge reader 100 to further prevent cartridge reader 100 from moving when data cartridges are positioned into cartridge reader 100 for scanning.

Port holes 104A, 104B (port holes 104) correspond, in the example of FIG. 6, to USB ports 98A, 98B of FIG. 5, respectively. Port holes 104 permit an interface cable, such as a USB cable, to be inserted into ports 98 through lower housing 102. In other embodiments, port holes 104 may be in a different location, and there may be a different number of holes in lower housing 102. Port holes 104 may also be located in upper housing 112 to receive a cable through upper housing 112. USB ports 98 may be fixed to and within lower housing 102 by screws, epoxy, or other suitable means.

Figure 7:
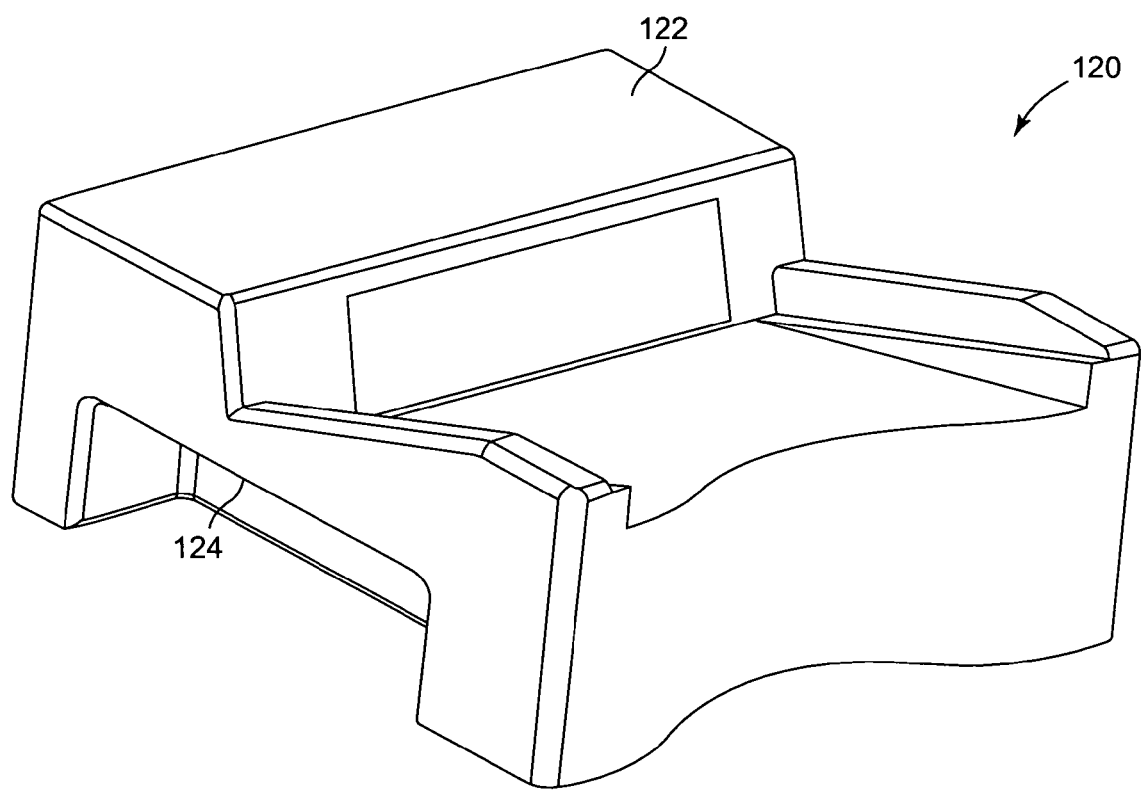
FIG. 7 is a perspective front view of an example embodiment of a cartridge reader that includes cut-outs on the sides of a bottom portion of a housing of the cartridge reader.

FIG. 7 is a perspective front view of an example cartridge reader 120 that includes cut-out 124 on a bottom portion of housing 122. Cartridge reader 120 includes a second cut-out similar to cut-out 124 on housing 122 at the opposite side of cut-out 124 (not shown). These cut-outs enable a user to more easily position, carry, and hold cartridge reader 120 from the side or bottom of cartridge reader 120 when using or moving cartridge reader 120. Similar cut-outs may be included in other embodiments of a cartridge reader, such as cartridge readers 16, 30, 50, 70, 90, and 100. The edge of cut-out 124 is also rounded, making cut-out 124 comfortable to grip for a user.

Figure 8:
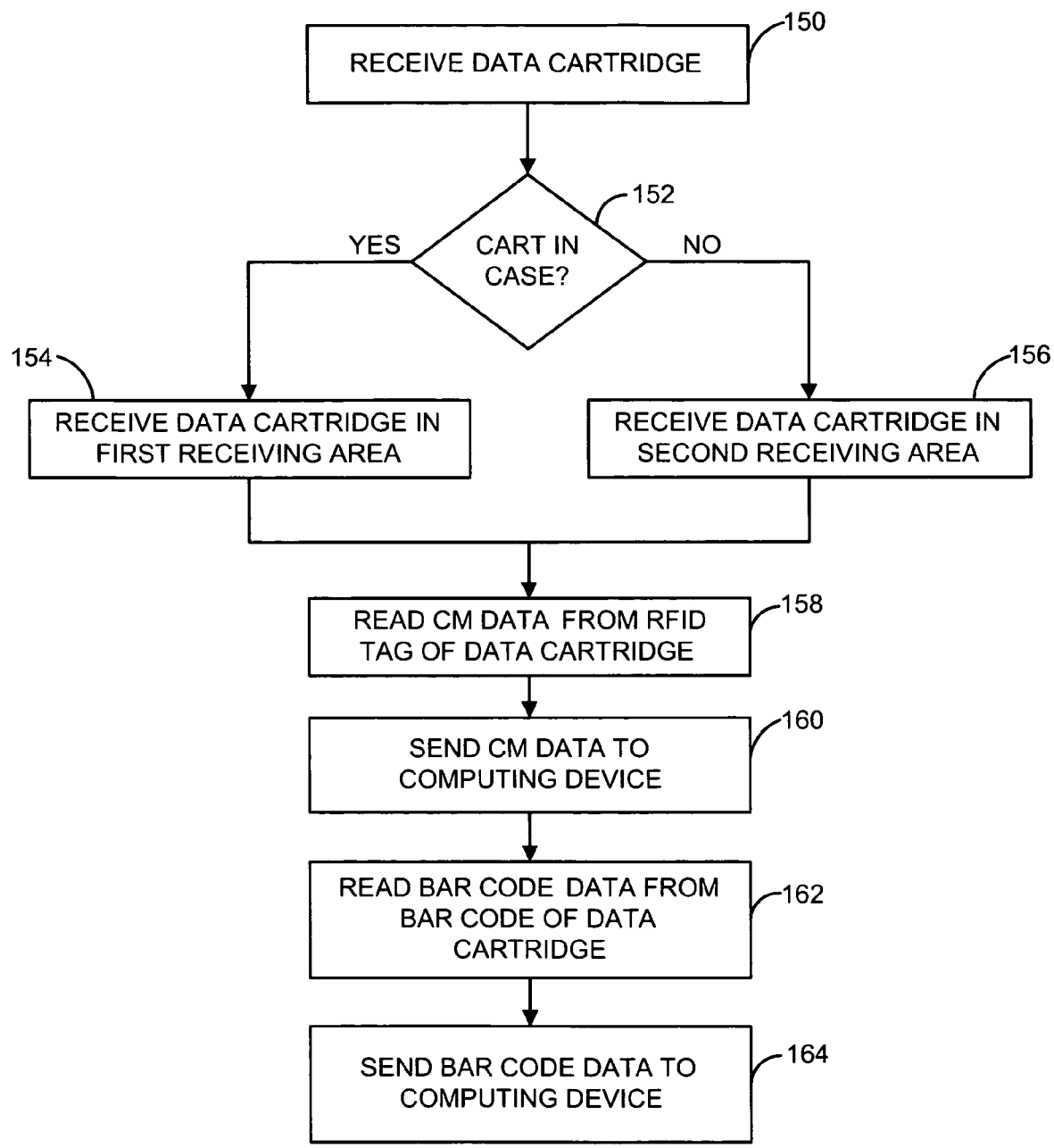
FIG. 8 is a flowchart illustrating an example mode of operation of a cartridge reader.

FIG. 8 is a flowchart illustrating an example mode of operation of a cartridge reader. The example method of FIG. 8 is discussed with respect to cartridge reader 70 of FIG. 4. However, a similar method may apply with respect to any embodiment of a cartridge reader as discussed herein.

Initially, cartridge reader 70 receives a data cartridge to scan (150). Typically, cartridge reader 70 receives a data cartridge from a human user. However, in some embodiments, cartridge reader 70 may receive data cartridges from autonomous or automatic systems, such as systems that include robotic arms to manipulate data cartridges. In any case, cartridge reader 70 receives a data cartridge that is to have its bar code and/or RFID tag read by cartridge reader 70. Cartridge reader 70 may read either or both of the bar code and the RFID tag of the data cartridge.

The data cartridge may be contained in a standard, polypropylene case designed to protect the data cartridge. When the data cartridge is in such a case ("YES" branch of 152), the cartridge is placed in the first receiving area of cartridge reader 70 (154). In the example of cartridge reader 70, the data cartridge is placed on top of rails 76A, 76B, with the bar code facing window 80. In some embodiments, a user or other operator of the cartridge reader may need to manipulate elements of the cartridge reader to properly position the data cartridge in the first receiving area. For example, for cartridge reader 30 (FIGS. 2A-2B), the operator may need to remove removable insert 34 from the top of housing 40 and position the data cartridge on surface 38 of cartridge reader 30 (as shown in FIG. 2B). As another example, for cartridge reader 50 (FIGS. 3A-3B), the operator may need to rotate rotatable members 54A, 54B about pivot points 58A, 58B, respectively, to position rotatable members 54A, 54B to receive a data cartridge in a case (as shown in FIG. 3B).

When the data cartridge is not in a case ("NO" branch of 152), the cartridge is placed in the second receiving area of cartridge reader 70 (156). In the example of cartridge reader 70, the data cartridge is placed between rails 76A, 76B on surface 74 of housing 72, with the bar code facing window 80.

In some embodiments, a user or other operator of the cartridge reader may need to manipulate elements of the cartridge reader to properly position the data cartridge in the first receiving area. For example, for cartridge reader 30 (FIGS. 2A-2B), the operator may need to place removable insert 34 on the top of housing 40 of cartridge reader 30 (as shown in FIG. 2A) and position the data cartridge within removable insert 34. As another example, for cartridge reader 50 (FIGS. 3A-3B), the operator may need to rotate rotatable members 54A, 54B about pivot points 58A, 58B, respectively, to position rotatable members 54A, 54B to receive a data cartridge that is not in a case (as shown in FIG. 3A).

Once the data cartridge has been placed in the proper receiving area, cartridge reader 70 may scan the RFID tag thereof to retrieve CM chip data from the RFID tag (158). A user may control cartridge reader 70 using a computing device to cause cartridge reader 70 to retrieve the CM chip data from the RFID tag. Cartridge reader 70 may then send the CM chip data to the computing device (160). The user may also cause cartridge reader 70 to read bar code data from the bar code of the data cartridge (162). When the data cartridge is in a case, the first receiving area properly positions the data cartridge such that cartridge reader 70 is able to read the bar code data, and when the data cartridge is not in a case, the second receiving area properly positions the data cartridge such that cartridge reader 70 is still able to read the bar code data. After reading the bar code data, the cartridge reader may send the bar code data to the computing device (164). The cartridge reader may, alternatively, read the bar code data before reading the CM chip data. The cartridge reader may also read both the bar code and the CM chip before sending data thereof to the computing device.

In other embodiments, the cartridge reader may detect the presence of a data cartridge and automatically retrieve bar code data and CM chip data from the data cartridge without interfacing with a computing device. The cartridge reader may also include one or more buttons, levers, switches, or other interface objects that a user may manipulate to cause the cartridge reader to retrieve the bar code data and the CM chip data. The cartridge reader may store all retrieved data in a computer-readable medium until the data can be sent to a computing device.

Various embodiments have been described. These and other embodiments are within the scope of the following claims.

The invention claimed is:

1. A cartridge reader device comprising:
   a radio frequency identification (RFID) unit that reads cartridge memory (CM) data from an RFID tag of a data cartridge;
   a bar code unit that reads bar code data from a bar code of the data cartridge; and
   a housing that encloses the RFID unit and the bar code unit, wherein the housing defines a first receiving area and a second receiving area,
   wherein the first receiving area is configured to accept the data cartridge when the data cartridge is enclosed in a case and enables the bar code unit to read the bar code data from the bar code of the data cartridge when the data cartridge is enclosed in the case, and
   wherein the second receiving area is configured to accept the data cartridge when the data cartridge is not enclosed in the case and enables the bar code unit to read the bar code data from the bar code of the data cartridge when the data cartridge is not enclosed in the case.

2. The device of claim 1, further comprising a removable insert, wherein the housing comprises a location on a top portion of the housing for the removable insert, wherein the location for the removable insert defines the first receiving area when the removable insert is not inserted into the location, and wherein the removable insert defines the second receiving area when the removable insert is inserted into the location.

3. The device of claim 2, wherein the housing comprises a storage space for the removable insert that stores the removable insert when the removable insert is not inserted.

4. The device of claim 1, wherein the housing defines a substantially horizontal surface and two inclined rails that lie at an angle relative to the substantially horizontal surface, wherein the housing defines the first receiving area with the tops of the two inclined rails, and wherein the housing defines the second receiving area with the top of the substantially horizontal surface and the sides of the two inclined rails.

5. The device of claim 4, wherein the substantially horizontal surface is angled relative to a bottom surface of the housing by greater than five degrees and less than forty-five degrees.

6. The device of claim 5, wherein the substantially horizontal surface is angled relative to the bottom portion of the housing by at least eleven degrees and by no more than seventeen degrees.

7. The device of claim 4, wherein the angle of the two inclined rails relative to the horizontal surface is less than ten degrees.

8. The device of claim 1, wherein the housing comprises a pair of rotatable members, wherein the rotatable members rotate between a first position and a second position, wherein the first position of the rotatable members defines the first receiving area, and wherein the second position of the rotatable members defines the second receiving area.

9. The device of claim 1, wherein the housing defines a half-moon cut-out to enable the data cartridge to overhang an edge of the housing by approximately 2.54 cm.

10. The device of claim 1, further comprising a pair of mirrors positioned within the housing that direct light emitted by the bar code reader to the bar code of the data cartridge along a u-shaped path.

11. The device of claim 1, wherein the housing defines a pair of guide rails comprising lead-in angles that guide the data cartridge into at least one of the first receiving area or the second receiving area.

12. The device of claim 1, wherein the housing further comprises a window facing both the first receiving area and the second receiving area, wherein the window allows light from the bar code reader to pass through the window to the bar code of the data cartridge whether the data cartridge is placed in the first receiving area or the second receiving area, and wherein the housing encloses the light from the bar code reader in all locations other than the window.

13. A system comprising:
   a data cartridge comprising a bar code and a radio frequency identification (RFID) tag storing cartridge memory (CM) data;
   a cartridge reader comprising:
      an RFID unit that reads the CM data from the RFID tag of the data cartridge;
      a bar code unit that reads bar code data from the bar code of the data cartridge; and
      a housing that encloses the RFID unit and the bar code unit, wherein the housing defines a first receiving area and a second receiving area,
      wherein the first receiving area is configured to accept the data cartridge when the data cartridge is enclosed in a case and enables the bar code unit to read the bar code data from the bar code of the data cartridge when the data cartridge is enclosed in the case, and wherein the second receiving area is configured to accept the data cartridge when the data cartridge is not enclosed in the case and enables the bar code unit to read the bar code data from the bar code of the data cartridge when the data cartridge is not enclosed in the case; and a computing device coupled to the cartridge reader, wherein the computing device causes the cartridge reader to retrieve the bar code data and the CM data from the data cartridge, and wherein the computing device receives the bar code data and the CM data from the cartridge reader.

14. The system of claim 13, wherein the cartridge reader comprises a universal serial bus (USB) port, and wherein the cartridge reader and the computing device are coupled by a USB cable.

15. The system of claim 13, wherein the housing of the cartridge reader defines a substantially horizontal surface and two inclined rails that lie at an angle relative to the substantially horizontal surface, wherein the housing defines the first receiving area with the tops of the two inclined rails, and wherein the housing defines the second receiving area with the top of the substantially horizontal surface and the sides of the two inclined rails.

16. The system of claim 15, wherein the substantially horizontal surface is angled relative to the bottom portion of the housing of the cartridge reader by at least eleven degrees and by no more than seventeen degrees.

17. The system of claim 13, wherein the cartridge reader further comprises a pair of mirrors positioned within the housing that direct light emitted by the bar code reader to the bar code of the data cartridge along a u-shaped path within the housing of the cartridge reader.

18. The system of claim 13, wherein the bar code of the data cartridge comprises a VOLSER label.

19. A device comprising:

means for reading cartridge memory (CM) data from a radio frequency identification (RFID) tag of a data cartridge;

means for reading bar code data from a bar code of the data cartridge; and housing means for enclosing the means for reading CM data and the means for reading bar code data, wherein the housing means comprises means for accepting the data cartridge when the data cartridge is enclosed in a case that enables the means for reading the bar code data to read the bar code data from the bar code of the data cartridge when the data cartridge is enclosed in the case, and wherein the housing means comprises means for accepting the data cartridge when the data cartridge is not enclosed in the case that enables the means for reading the bar code data to read the bar code data from the bar code of the data cartridge when the data cartridge is not enclosed in the case.

20. The device of claim 19, further comprising means for directing light from the means for reading the bar code data along a unshaped path to the bar code of the data cartridge.

* * * * *

UNITED STATES PATENT AND TRADEMARK OFFICE
CERTIFICATE OF CORRECTION

Page 1 of 1

PATENT NO.        : 7,975,925 B2
APPLICATION NO.   : 12/322599
DATED             : July 12, 2011
INVENTOR(S)       : Jackson et al.

It is certified that error appears in the above-identified patent and that said Letters Patent is hereby corrected as shown below:

Column 14, line 30 (Claim 20): "unshaped" should read -- u-shaped --

Signed and Sealed this
Eighteenth Day of October, 2011

David J. Kappos
*Director of the United States Patent and Trademark Office*